(12) United States Patent
Tsuchiya et al.

(10) Patent No.: US 11,298,613 B2
(45) Date of Patent: Apr. 12, 2022

(54) INFORMATION PROCESSING DEVICE, DATA ACQUISITION METHOD, AND PROGRAM

(71) Applicant: Sony Interactive Entertainment Inc., Tokyo (JP)

(72) Inventors: Akitsugu Tsuchiya, Kanagawa (JP); Masaki Takahashi, Kanagawa (JP); Shigeru Enomoto, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 798 days.

(21) Appl. No.: 15/427,661

(22) Filed: Feb. 8, 2017

(65) Prior Publication Data
US 2017/0340965 A1    Nov. 30, 2017

(30) Foreign Application Priority Data
May 31, 2016 (JP) .............................. JP2016-109307

(51) Int. Cl.
*A63F 9/24* (2006.01)
*A63F 13/327* (2014.01)
(Continued)

(52) U.S. Cl.
CPC .......... *A63F 13/327* (2014.09); *A63F 13/493* (2014.09); *A63F 13/77* (2014.09); *H04W 8/005* (2013.01); *H04W 84/12* (2013.01)

(58) Field of Classification Search
CPC .............................. H04L 67/104; A63F 13/32
See application file for complete search history.

(56) References Cited

U.S. PATENT DOCUMENTS

2004/0162871 A1* 8/2004 Pabla ................... H04W 8/005
709/201
2004/0249972 A1* 12/2004 White .................. H04L 67/104
709/243
(Continued)

FOREIGN PATENT DOCUMENTS

JP    2003-150742 A    5/2003
JP    2004-147017 A    5/2004
(Continued)

OTHER PUBLICATIONS https://www.wikihow.com/System-Link-Two-or-More-Xbox-or-Xbox-360-Consoles#:~:text=Simply%20use%20your%20system%20link,on%20the%20original%20Xbox%20360 How to system link two or more xbox consoles—date of NPL verified by Wayback machine https://web.archive.org/web/*/https://ww (Year: 2007).*

(Continued)

*Primary Examiner* — David L Lewis
*Assistant Examiner* — Eric M Thomas
(74) *Attorney, Agent, or Firm* — Katten Muchin Rosenman LLP

(57) ABSTRACT

An information processing device connected to a wireless LAN constituted by an access point, the information processing device acquiring application data from another information processing device connected to the wireless LAN. The information processing device includes a device detection section and a recording processing section. The device detecting section detects the other information processing device connected to the wireless LAN. The recording processing section, after the device detecting section has detected the other information processing device connected to the wireless LAN, acquires the application data from the other information processing device via a cable.

9 Claims, 9 Drawing Sheets

(51) Int. Cl.
*A63F 13/77* (2014.01)
*A63F 13/493* (2014.01)
*H04W 8/00* (2009.01)
*H04W 84/12* (2009.01)

(56) References Cited

U.S. PATENT DOCUMENTS

| | | | | |
|---|---|---|---|---|
| 2006/0010251 | A1* | 1/2006 | Mrsic-Flogel | H04L 12/1822 709/245 |
| 2010/0093273 | A1* | 4/2010 | Hohl | H04L 67/1095 455/7 |
| 2010/0241711 | A1* | 9/2010 | Ansari | H04L 12/2812 709/205 |
| 2010/0262714 | A1* | 10/2010 | Hiie | H04L 65/4007 709/234 |
| 2011/0010624 | A1* | 1/2011 | Vanslette | G06Q 50/04 715/704 |
| 2013/0260817 | A1* | 10/2013 | Dahrouj | H04W 52/244 455/522 |

FOREIGN PATENT DOCUMENTS

| | | |
|---|---|---|
| JP | 2011-029920 A | 2/2011 |
| JP | 2008-264112 A | 11/2011 |
| JP | 2012-055535 A | 3/2012 |
| JP | 2013-165933 A | 8/2013 |
| JP | 2014-210126 A | 11/2014 |

OTHER PUBLICATIONS

Japanese Office Action dated May 8, 2018 for the Corresponding Japanese Patent Application No. 2016-109307.
Hard-Drive Transfer Kit for the Xbox 360 Elite System; www.xbox.com/support; 2007 Microsoft Corporation.

* cited by examiner

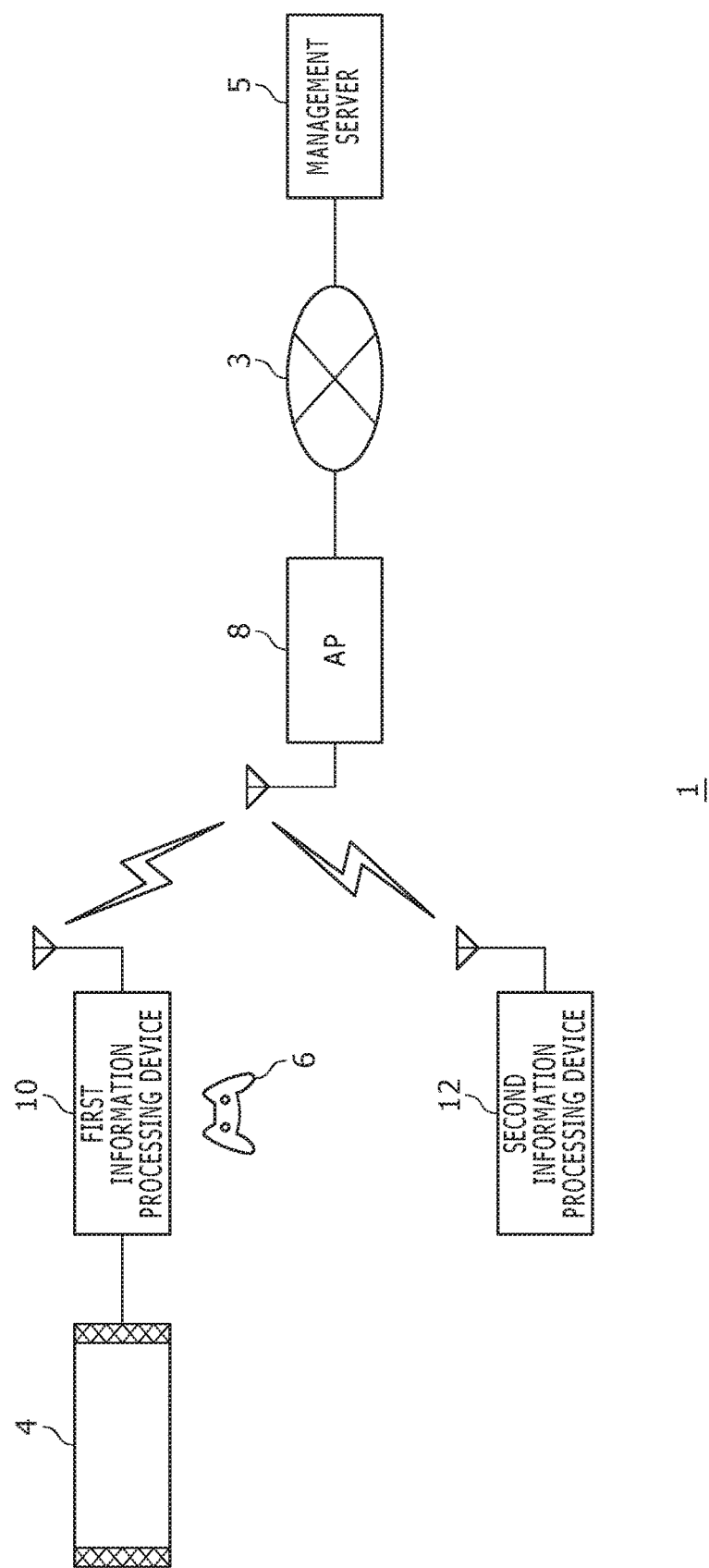

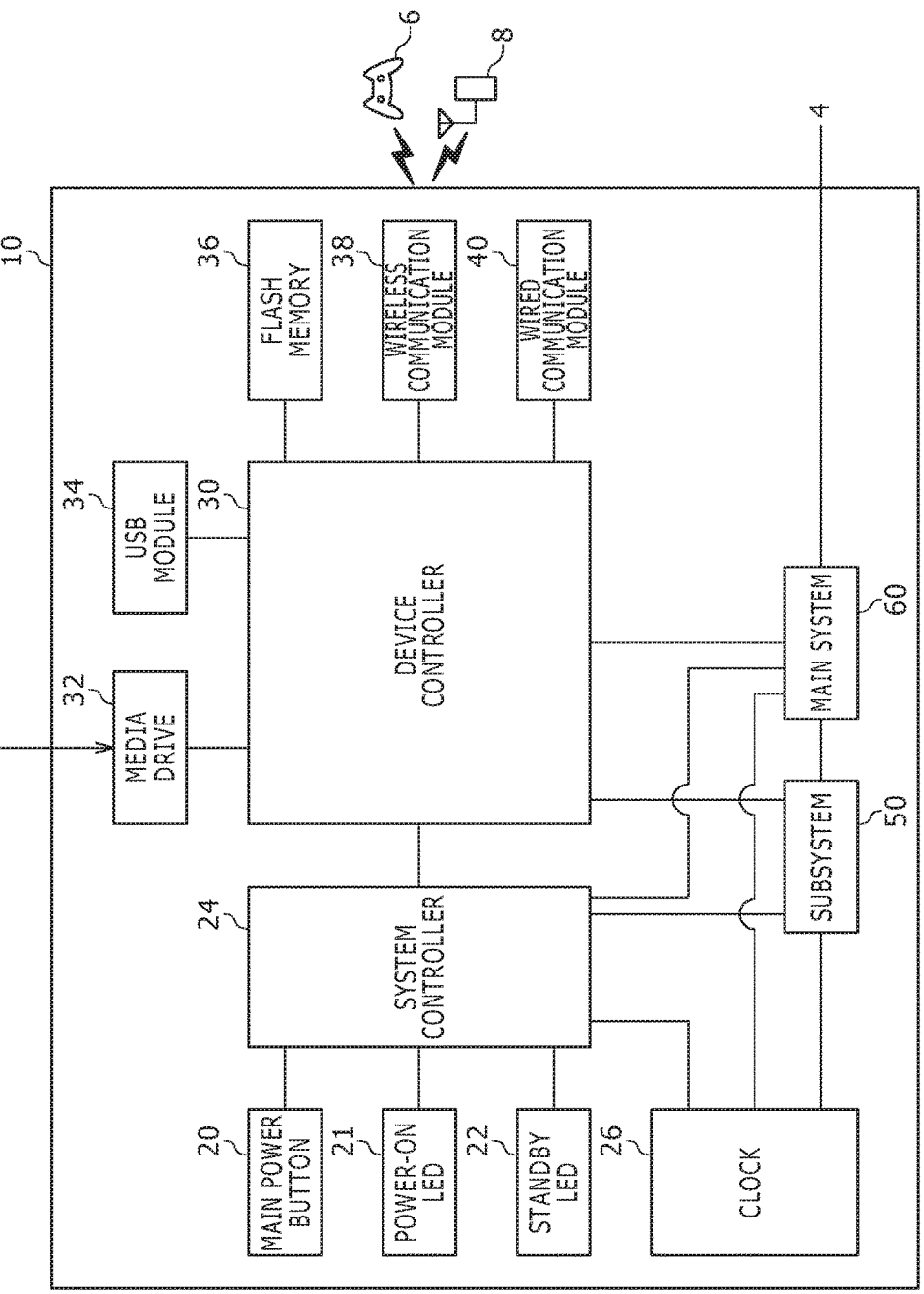

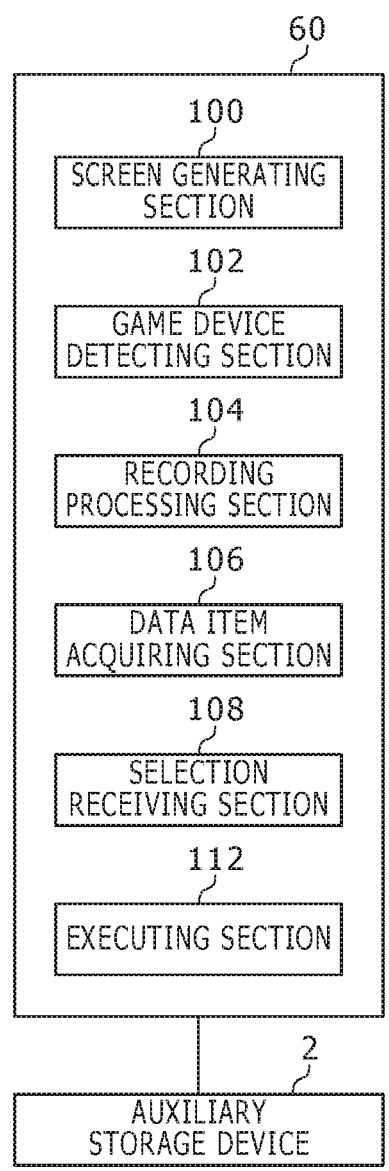

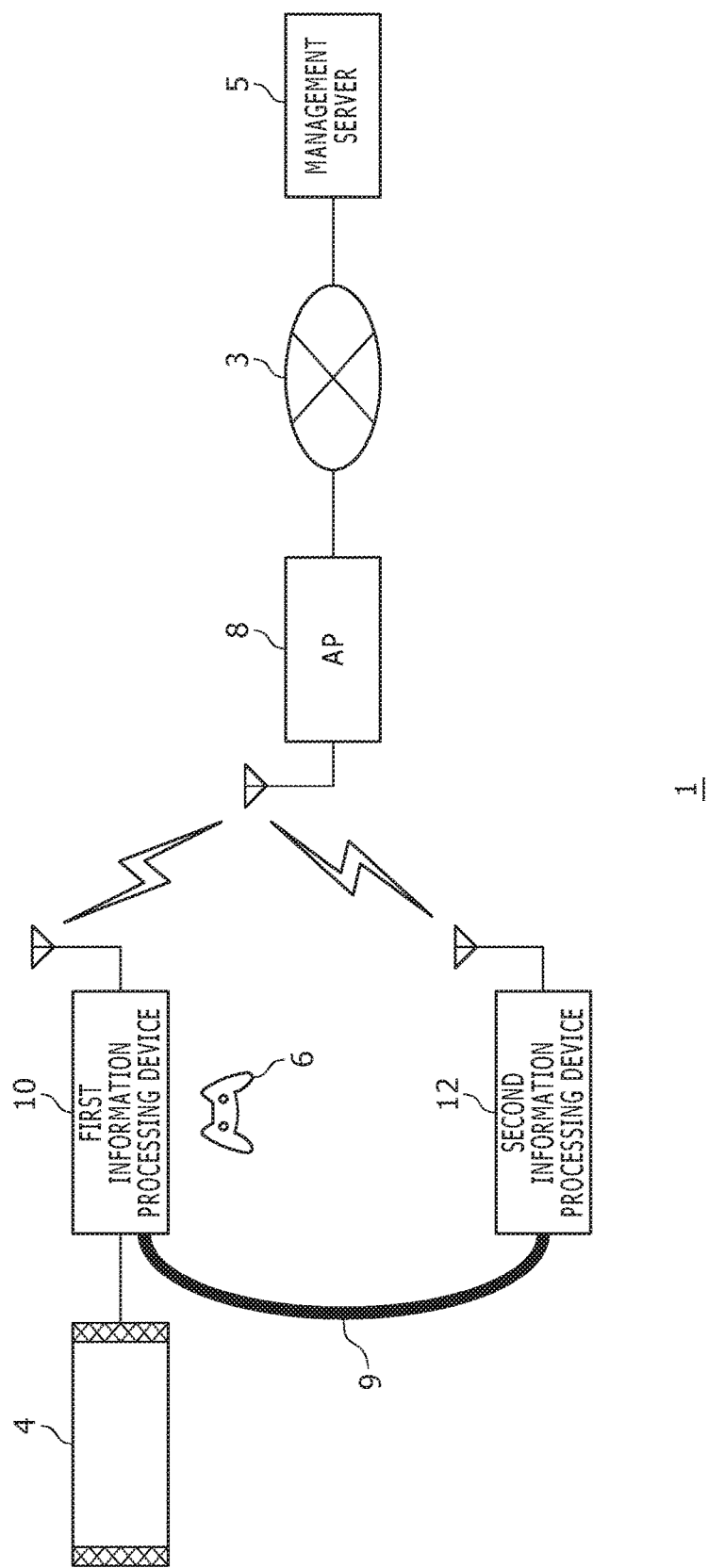

FIG.7A

| TRANSFER DATA | | | |
|---|---|---|---|
| SELECT DATA TO BE TRANSFERRED. | | | |
| APPLICATIONS | 600 GB | NOT SELECTED | |
| SAVE DATA | 10 GB | | ☐ |
| SETTINGS | 3 GB | | ☐ |

CANCEL   NEXT

⊗ BACK  ⊚ ENTER

APPLICATIONS

SELECT APPLICATIONS TO BE COPIED.

| ☐ GAME TITLE 1 | 50 GB | SELECT ALL |
|---|---|---|
| ☐ GAME TITLE 2 | 60 GB | CANCEL ALL |
| ☐ GAME TITLE 3 | 30 GB | |
| ☐ GAME TITLE 4 | 40 GB | NEXT |

⊗ BACK  ⊚ ENTER

4

FIG.9A

```
TRANSFER DATA
─────────────────────────────────────────────
DO YOU WISH TO CHANGE THIS GAME DEVICE TO "GAME DEVICE
TO BE ALWAYS USED"?

ONLY ONE "GAME DEVICE TO BE ALWAYS USED" CAN BE REGISTERED
TO YOUR ACCOUNT. THIS GAME DEVICE WILL BE REGISTERED AFTER
REGISTRATION OF GAME DEVICE USED SO FAR IS
CANCELED.

[ CHANGE ]              [ DO NOT CHANGE ]

─────────────────────────────────────────────
◎ ENTER
```

```
TRANSFER DATA
─────────────────────────────────────────────
ONCE DATA TRANSFER IS STARTED, CURRENT STATE WILL
NEVER BE RECOVERED.

ARE YOU REALLY SURE?

IF YOU SELECT "YES," GAME DEVICE IS AUTOMATICALLY RESTARTED
AND INITIALIZED AND STARTS TO TRANSFER DATA. CANCELING
TRANSFER PROCESS HALFWAY WILL NOT STOP GAME DEVICE FROM
BEING INITIALIZED.

[ NO ]                      [ YES ]

─────────────────────────────────────────────
◎ ENTER
```

4

INFORMATION PROCESSING DEVICE, DATA ACQUISITION METHOD, AND PROGRAM

BACKGROUND

The present disclosure relates to techniques for transferring application data between information processing devices.

In the past, stationary game machines had a recording medium that holds game data inserted therein before reading the game data from the inserted recording medium to execute games. In recent years, it has been widespread practice to download game data from servers and install the downloaded data into an auxiliary storage device of the game machine. With diverse titles of game data thus installed in the game machine, the user can play the installed games without recourse to the recording media.

There is a technique for efficiently implementing an environment in which to update software (see Japanese Patent Laid-Open No. 2016-1391, for example).

SUMMARY

Already in possession of at least one game machine, the user may purchase another game machine. For example, the user makes the purchase upon the release of a new-generation game machine or a game machine which is of the same generation as the currently owned game machine but of which the device performance such as the clock rate or graphics processing unit (GPU) performance has been upgraded. In one use case, the user may set up multiple game machines in different locations in the home. For example, one game machine may be set up in the bedroom and the new one in the living room. In another use case, the old game machine may be replaced with the new game machine, the old machine being left unused thereafter.

In these use cases, the user may wish to transfer the game data recorded in the old game machine to the new game machine. In particular, where the old game machine is replaced with the new game machine, transferring at least part of the game data from the old game machine to the new one will allow the user to play previously played games also on the new game machine. Thus there is a need for a scheme that permits efficient copying of data from the old game machine to the new game machine.

When game data is downloaded from a server to a game machine, it is preferred that both the server and the game machine hold information about the association between a user account and used device information (authentication information on the game machine) in order to download the game data efficiently. With the association information shared by the server and the game machine, the user may use a user terminal other than the game machine to request a game data download from the server, for example. The server in turn delivers the data to the user terminal as requested. This may require appropriately updating the association information when the old game machine is replaced with the new game machine.

The present disclosure has been made in view of the above circumstances, and there is a need for the present disclosure to implement an environment in which application data such as game data and/or association information is efficiently transferred between devices.

In achieving the above and other objects of the present disclosure and according to one embodiment thereof, there is provided an information processing device connected to a wireless local area network (LAN) constituted by an access point, the information processing device acquiring application data from another information processing device connected to the wireless LAN. The information processing device includes a device detecting section configured to detect the other information processing device connected to the wireless LAN, and a recording processing section configured, after the device detecting section has detected the other information processing device connected to the wireless LAN, to acquire the application data from the other information processing device via a cable.

According to another embodiment of the present disclosure, there is provided a data acquisition method whereby an information processing device connected to a wireless LAN constituted by an access point acquires application data from another information processing device connected to the wireless LAN. The data acquisition method includes, after detecting the other information processing device connected to the wireless LAN, acquiring the application data from the other information processing device via a cable.

According to further another embodiment of the present disclosure, there is provided a program for computer connected to a wireless LAN constituted by an access point to implement. The program includes by a device detecting section, detecting an information processing device connected to the wireless LAN, and by a recording processing section, after detecting the information processing device connected to the wireless LAN, acquiring application data from the information processing device via a cable.

If other combinations of the above-outlined composing elements or the above expressions of the present disclosure are converted between different forms such as a method, a device, a system, a recording medium, and a computer program, they still constitute effective embodiments of the present disclosure.

The information processing technology of the present disclosure thus permits implementation of an environment conducive to efficiently transferring application data and/or association information between devices.

BRIEF DESCRIPTION OF THE DRAWINGS

FIG. 1 is a schematic view depicting an information processing system as one embodiment of the present disclosure;

FIG. 2 is a block diagram depicting functional blocks of a first information processing device as part of the embodiment;

FIG. 3 is a schematic view depicting a structure of the first information processing device;

FIG. 6 is a schematic view depicting how the first information processing device and a second information processing device are interconnected by a LAN cable;

FIGS. 7A and 7B are schematic views depicting other typical screens displayed on the display device;

FIGS. 8A and 8B are schematic views depicting other typical screens displayed on the display device; and FIGS. 9A and 9B are schematic views depicting other typical screens displayed on the display device.

DETAILED DESCRIPTION OF THE PREFERRED EMBODIMENT

Figure 4A:
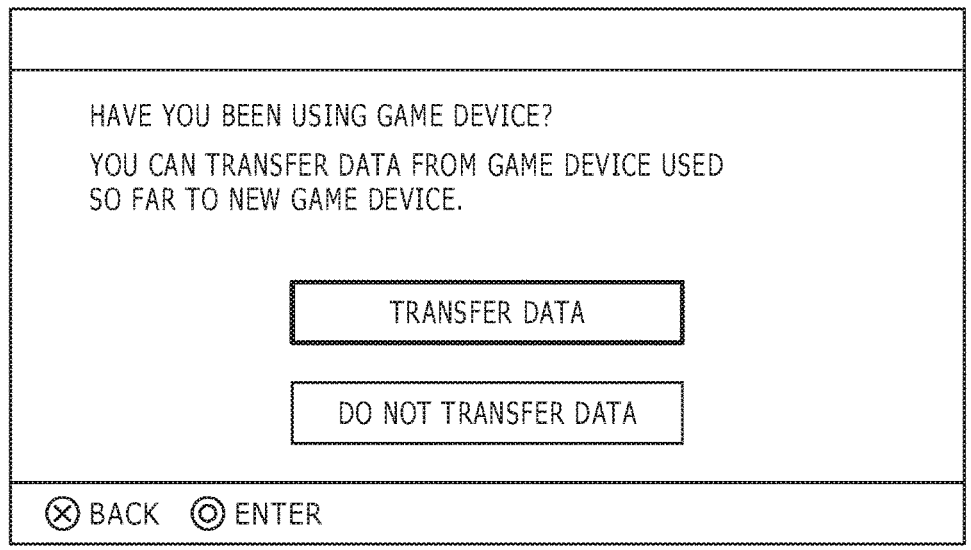
FIGS. 4A and 4B are schematic views depicting typical screens displayed on a display device.

Novel techniques for allowing a new information processing device to acquire application data recorded in an old information processing device are described below in conjunction with one preferred embodiment of the present disclosure. The application data recorded in the old information processing device includes not only application software such as game programs previously downloaded from content servers and patch files but also downloadable content (DLC) regarding applications and the save data stored in the past by the user. When the application data recorded in the old information processing device is transferred to the new information processing device, the applications that were executed on the old information processing device can also be run on the new information processing device by the user.

FIG. 1 depicts an information processing system 1 as one embodiment of the present disclosure. The information processing system 1 includes a first information processing device 10 as a user terminal, a second information processing device 12 as another user terminal, an access point (AP) 8 constituting a wireless LAN, and a management server 5. In the embodiment, the first information processing device 10 is a stationary game device newly purchased by the user, and the second information processing device 12 is a stationary game device owned so far by the user. The first and the second information processing devices 10 and 12 do not incorporate a display device. Instead, these devices are connected to a display device 4 such as a television (TV) set and have the result of their processing displayed on the connected display device 4.

The first and the second information processing devices 10 and 12 have each an auxiliary storage device, which is a mass storage device such as a hard disk drive (HDD) or a flash memory. The second information processing device 12 used so far by the user has multiple application data recorded in its auxiliary storage device. On the other hand, the first information processing device 10 is a newly purchased game device that has only preinstalled application data stored in its auxiliary storage device. Although the ensuing description will treat the applications as video games, the applications may also be something other than the games.

The AP 8 is a wireless router that provides the functions of a wireless access point and a router. The first and the second information processing devices 10 and 12 have each a wireless LAN communication function permitting connection to the wireless LAN. In standby mode, the first and the second information processing devices 10 and 12 also connect to the wireless LAN. The first and the second information processing devices 10 and 12 are connected communicably to the management server 5 via the AP 8.

The management server 5 provides network services such as download service. The management server 5 may be physically made up of multiple servers, each server being maintained and managed by an entity corresponding to the function assigned to each server. The management server 5 includes a network server. After signing in to the network server, the user is authorized to receive various services from the management server 5. The first and the second information processing devices 10 and 12 are each configured to let the user automatically sign in to the network server when the devices are connected to the wireless LAN.

The management serve 5 manages association information associating a user account with used device information. In the information processing system 1, the user registers in the management server 5 information identifying one information processing device as the used device (primary device) information. The user may register in the management server 5 multiple terminal devices to be used in association with the user account. Of the multiple terminal devices, the one serving as an information processing device on which games can be played is registered as the primary device. Where the user has used only one second information processing device 12, the second information processing device 12 has been registered as the primary device in the management server 5.

The primary device is granted various privileges. For example, the primary device is used as the destination to which application software and DLC are downloaded. In the information processing system 1, the user may access the management server 5 from a terminal device such as a smartphone to transmit to the management server 5 a request for downloading desired game software. Upon receipt of the download request, the management server 5 references the association information to identify the primary device associated with the user account and delivers the requested game software to the primary device. Also, the primary device allows the user to play the downloaded game even if the user has yet to sign in to the management server 5. On the other hand, an information processing device not registered as the primary device does not allow the user to play games when the user has yet to sign in.

In the embodiment, the management server 5 manages the association information associating the user account with the information identifying the second information processing device 12 before the first information processing device 10 is connected to the management server 5. Once registered in the management server 5, the association information is sent from the management server 5 to the second information processing device 12. Thus the second information processing device 12 also holds the association information.

On the above-described assumption, a case is described below in which the user has newly purchased the first information processing device 10 and replaces the old second information processing device 12 with the new first information processing device 10. Before purchasing the first information processing device 10, the user played games on the second information processing device 12 connected to the display device 4. Thus multiple game data are currently recorded in the auxiliary storage device of the second information processing device 12.

After purchasing the first information processing device 10, the user disconnects the second information processing device 12 from the display device 4 and connects the first information processing device 10 to the display device 4. FIG. 1 depicts an environment that applies to the case above. FIG. 1 indicates how the second information processing device 12 is connected to the wireless LAN. When the first information processing device 10 replaces the second information processing device 12, there is a possibility that the power cable of the second information processing device 12 is unplugged from an outlet so that the second information processing device 12 is disconnected from the wireless LAN.

When the first information processing device 10 is connected to the display device 4 and the main power of the first information processing device 10 is turned on, the user may operate an input device 6 to transmit operating information to the first information processing device 10. The input device 6 may be connected to the first information processing device 10 in wired or wireless fashion. After receiving the operating information from the input device 6, the first information processing device 10 allows the received information to be reflected in the processing of system software and causes the result of the processing to be displayed on the display device 4. The input device 6 may be a game controller that supplies the user's operating information to the first information processing device 10 serving as the game device. The game controller is made up of multiple push-type operation buttons and multiple input parts such as analog sticks and rotary buttons permitting input of analog quantities.

The management server 5 also has the function of offering system software for constituting an environment in which the first and the second information processing devices 10 and 12 are used. The system software manages and controls the computer hardware, and includes an operating system (OS) and middleware for expanding the basic functions of the OS. The management server 5 holds the system software of the latest version and offers it as requested to the first information processing device 10 and/or to the second information processing device 12. The first and the second information processing devices 10 and 12 can make use of the network function by installing the system software of the latest version.

FIG. 2 is a block diagram depicting functional blocks of the first information processing device 10. The first information processing device 10 is configured to have a main power button 20, a power-ON light-emitting diode (LED) 21, a standby LED 22, a system controller 24, a clock 26, a device controller 30, a media drive 32, a universal serial bus (USB) module 34, a flash memory 36, a wireless communication module 38, a wired communication module 40, a subsystem 50, and a main system 60. The second information processing device 12 may be configured the same as the first information processing device 10.

The main system 60 includes a main central processing unit (CPU), a memory and a memory controller making up a main storage device, and a GPU. The GPU is used primarily for arithmetic processing of game programs. These functions may be formed on a single chip constituting a system-on-chip. The main CPU has the function of executing the game programs recorded in the auxiliary storage device.

The subsystem 50 includes a sub CPU, and a memory and a memory controller making up a main storage device. The subsystem 50 has neither a GPU nor the function of executing game programs. The number of circuit gates in the sub CPU is smaller than the number of circuit gates in the main CPU. The operating power consumption of the sub CPU is less than that of the main CPU. The sub CPU, which also operates while the main CPU is in standby mode, has its processing functions limited in order to reduce power consumption.

The main power button 20 is an input part on which the user performs an input operation. Located on the front of the housing of the first information processing device 10, the main power button 20 is turned on or off to feed or stop power to the main system 60 of the first information processing device 10. The power-ON LED 21 is lit when the main power button 20 is turned on. The standby LED 22 is lit in standby mode.

The system controller 24 detects whether the user has pressed the main power button 20. If the main power button 20 is pressed while the main power is switched off, the system controller 24 acquires the pressing operation as an "on-instruction." On the other hand, if the main power button 20 is pressed for a first time period (e.g., one second) while the main power is switched on, the system controller 24 acquires the pressing operation as an instruction for transition to standby mode. If the main power button 20 is pressed at least for a second time period (e.g., seven seconds), the system controller 24 acquires the pressing operation as an "off-instruction."

The clock 26 is a real-time clock that generates current date and time information. The clock 26 supplies the generated information to the system controller 24, the subsystem 50, and the main system 60.

The device controller 30 is configured to be a large-scale integrated circuit (LSI) such as a Southbridge that transfers information between devices. As illustrated, the device controller 30 is connected with such devices as the system controller 24, the media drive 32, the USB module 34, the flash memory 36, the wireless communication module 38, the wired communication module 40, the subsystem 50, and the main system 60. The device controller 30 absorbs differences between the devices in electrical characteristics and in data transfer rates so as to control the timing for data transfers therebetween.

The media drive 32 is a drive device loaded with a read-only memory (ROM) medium 44 that has application software such as video games and license information recorded thereon. The media drive 32 drives the loaded ROM medium 44 to read the recorded programs and data therefrom. The ROM medium 44 is a read-only recording medium such as an optical disk, a magneto-optical disk, or a Blu-ray disk.

The USB module 34 is a module that connects to an external device via a USB cable. The USB module 34 may also connect to an auxiliary storage device via a USB cable. The flash memory 36 is an auxiliary storage device constituting an internal storage. The wireless communication module 38 communicates wirelessly with the input device 6, for example, according to communication protocols such as Bluetooth (registered trademark) or Institute of Electrical and Electronics Engineers (IEEE) 802.11. The wireless communication module 38 may also support the third-generation digital mobile phone system in accordance with the International Mobile Telecommunication Standard 2000 (IMT-2000) stipulated by the International Telecommunication Union (ITU). The wireless communication module 38 may further support the digital mobile phone systems of other generations. In the embodiment, the wireless communication module 38 with its wireless LAN communication function connects to the AP 8 serving as a wireless router. The wired communication module 40 communicates with another device via a LAN cable, for example.

FIG. 3 depicts a structure of the first information processing device 10. The main system 60 includes a screen generating section 100, a game device detecting section 102, a recording processing section 104, a data item acquiring section 106, a selection receiving section 108, and an executing section 112. The recording processing section 104 has the function of copying or moving data to the auxiliary storage device 2 of the first information processing device 10 from the second information processing device 12 where the data is recorded. This structure may be constituted from hardware components such as the CPU and a memory of a computer, programs loaded into the memory, and storage. The drawing depicts functional blocks implemented by these components operating in coordination with one another. It should be clear to those skilled in the art that these functional blocks can be implemented in diverse forms by hardware alone, by software alone, or by a combination of both.

Explained below is a typical procedure for bringing the newly purchased first information processing device 10 into a usable state.

First, the user connects the first information processing device 10 to a power source by power cable and to the display device 4 by an HDMI (registered trademark) cable. When the user presses the main power button 20, the screen generating section 100 displays on the display device 4 a guidance screen showing how to connect the input device 6 to the first information processing device 10. The user connects the input device 6, which is a game controller, to the first information processing device 10 by USB cable according to the guidance screen.

The screen generating section 100 then displays a language selection screen on the display device 4. The language selection screen displays multiple language options system-supported by the first information processing device 10. The user selects his or her preferred language to determine the system language for use by the first information processing device 10.

With the system language determined, the user proceeds with setup work on the first information processing device 10 in accordance with a setup screen displayed on the display device 4 by the screen generating section 100. The setup screen displays such items as Internet connection setting, camera connection setting, date and time setting, and power-saving setting. The user completes these settings one after another. The Internet connection setting presents two options: "Use wireless fidelity (Wi-Fi)" and "Use LAN cable." With the embodiment, the user selects "Use Wi-Fi" to have the first information processing device 10 connected wirelessly to the AP 8. When all the items are suitably set, the setup is completed.

After the setup, the user registers the user account with the network service provided by the management server 5. At this point, the user may create a new account and register it in the management server 5. In this case, the application data recorded in the second information processing device 12 is not transferred to the new device. For the embodiment, it is assumed that the user account used by the user on the second information processing device 12, which is the previously used information processing device, will be registered unchanged in the management server 5. The process of transferring the application data recorded in the second information processing device 12 to the new device is then carried out.

FIG. 4A depicts a typical transfer query screen that appears when the same user account is registered in the management server 5. When the user registers in the management server 5 the same user account used on the second information processing device 12, the screen generating section 100 causes the display device 4 to display the transfer query screen depicted in FIG. 4A. When the user sets a highlight frame in thick lines to "Transfer data" and operates the Enter button of the input device 6, a data transfer process is started.

Figure 4B:
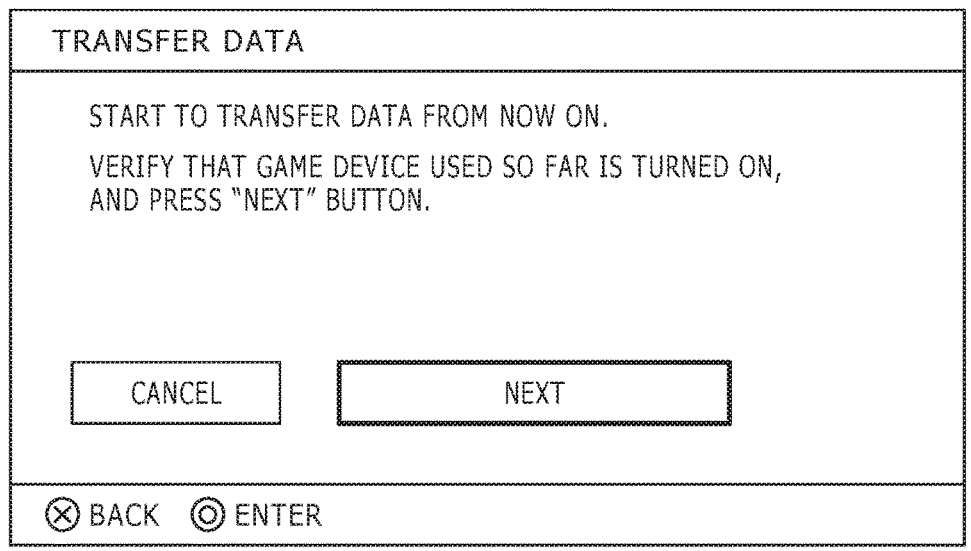

FIG. 4B depicts a typical transfer start screen. When performing the initial setup of the first information processing device 10, many users are unaware of the need to transfer data from the second information processing device 12 used so far to the new device. For this reason, the main power of the second information processing device 12 is often switched off at the time of the initial setup of the first information processing device 10. In some cases, the power cable of the second information processing device 12 is already unplugged from the outlet.

For that reason, the screen generating section 100 causes the display device 4 to display the transfer start screen depicted in FIG. 4B. The user is guided to connect the second information processing device 12 to a power source by power cable and turn on the main power. In the Internet connection setting of the second information processing device 12, the option "Use Wi-Fi" is registered. This allows the second information processing device 12 to connect to the wireless LAN when the main power of the second information processing device 12 is turned on.

After turning on the main power of the second information processing device 12, the user sets the highlight frame to "Next" in FIG. 4A, and operates the Enter button of the input device 6 (this operation may be simply referred to as "operating the 'Next' button" hereunder). This causes the game device detecting section 102 of the first information processing device 10 to transmit a predetermined search packet to the wireless LAN. The AP 8 forwards the search packet to the devices on the wireless LAN. On receiving the search packet, an information processing device on the wireless LAN returns a presence packet indicating its presence. In the embodiment, the second information processing device 12 is connected to the wireless LAN. Upon receipt of the search packet, the second information processing device 12 sends back the presence packet to the first information processing device 10. This allows the game device detecting section 102 to detect anther information processing device (i.e., second information processing device 12 in this case) connected to the wireless LAN.

When the game device detecting section 102 receives the presence packet, the first information processing device 10 starts a data transfer module. In the structure depicted in FIG. 3, the recording processing section 104, the data item acquiring section 106, and the selection receiving section 108 are the functions implemented by the data transfer module. The data transfer module also implements part of the functions of the screen generating section 100. During the data transfer process, the screen generating section 100 generates a screen regarding the operations to acquire application data.

At this point, if the data transfer module is also installed in the second information processing device 12, then the second information processing device 12 starts the installed data transfer module and transmits to the first information processing device 10 start information indicating that the data transfer module is started. In this case, the data transfer modules in both the first and the second information processing devices 10 and 12 operate in coordination with each other to transmit the application data from the auxiliary storage device of the second information processing device 12 to the first information processing device 10.

If no data transfer module is installed in the second information processing device 12, then the second information processing device 12 may not be able to start the data transfer module. That means the game device detecting section 102 does not acquire the start information about the data transfer module from the second information processing device 12. When the game device detecting section 102 does not acquire the data transfer module start information from the second information processing device 12 for a predetermined time period, the screen generating section 100 displays a system software update screen on the display device 4 as needed.

The system software update is a precondition for the first information processing device 10 to use the network functions. The user performs the process of updating the system software of the first information processing device 10 in keeping with the update screen displayed on the display device 4. Installing the latest system software allows the first information processing device 10 to make use of the network functions. If the system software is already of the latest version, the screen generating section 100 does not display the system software update screen on the display device 4.

When the system software of the second information processing device 12 needs to be updated, the screen generating section 100 causes the display device 4 to display an update screen for updating the system software of the second information processing device 12. While the system software is being updated, the screen generating section 100 may display system update progress status in a progress bar.

Figure 5A:
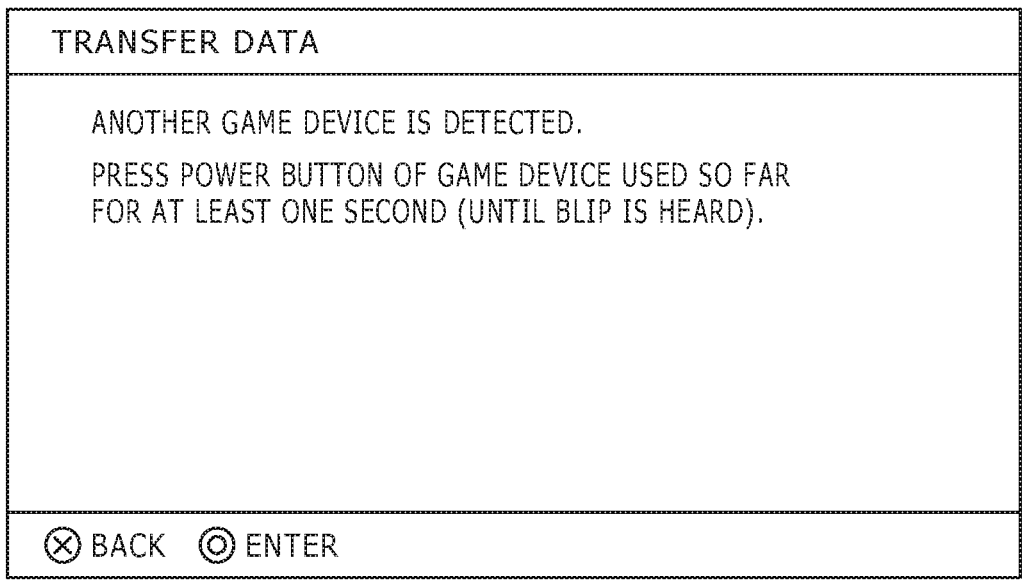
FIGS. 5A and 5B are schematic views depicting other typical screens displayed on the display device.

FIG. 5A depicts a typical own terminal verification screen. Upon completion of the system software update, the screen generating section 100 causes the display device 4 to display the own terminal verification screen depicted in FIG. 5A. The own terminal verification screen is a guidance screen that prompts the user to operate the power button of the game device used so far. Specifically, the own terminal verification screen prompts the user to press for at least one second the power button of the second information processing device 12 to let the second information processing device 12 transition to standby mode.

As described above, the first information processing device 10 is cognizant of another information processing device (second information processing device 12 in the embodiment) present on the wireless LAN constituted from the AP 8. However, there is a possibility that the wireless LAN is connected with an information processing device outside the home. That means another information processing device whose presence is verified could be owned by a stranger. Obviously, no data is allowed to be moved or copied from a stranger's information processing device.

Thus for security reasons, the first information processing device 10 causes the display device 4 to display the own terminal verification screen depicted in FIG. 5A and thereby prompts the user to operate the second information processing device 12. This is to ascertain that the second information processing device 12 as the source of data transmission is present near the user.

When the user presses the power button of the second information processing device 12 for at least one second, the second information processing device 12 transitions to standby mode. The game device detecting section 102 verifies the mode transition of the second information processing device 12 and recognizes that the second information processing device 12 on the wireless LAN has transitioned to standby mode. In this manner, the game device detecting section 102 verifies that the second information processing device 12 is near the user, and recognizes the second information processing device 12 as a legitimate source of data transmission.

Figure 5B:
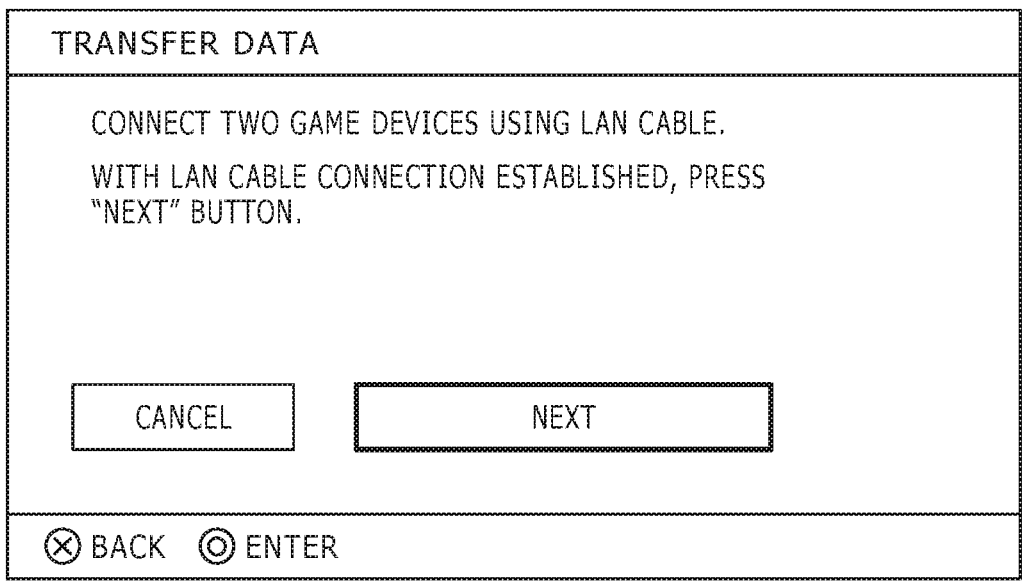

FIG. 5B depicts a typical guidance screen for generating an environment for data transmission. Following verification of the mode transition of the second information processing device 12, the screen generating section 100 generates a guidance screen that prompts the user to interconnect the first and the second information processing devices 10 and 12 by cable, the guidance screen being displayed on the display device 4. The data transmission environment for the embodiment is implemented by interconnecting the first and the second information processing device 10 and 12 via a LAN cable.

FIG. 6 depicts how the first and the second information processing devices 10 and 12 are interconnected by a LAN cable 9. In the information processing system 1 depicted in FIG. 1, the first and the second information processing devices 10 and 12 are interconnected on a wireless LAN. That means the first information processing device 10 can acquire application data from the second information processing device 12 via the PA 8 without the intervention of the LAN cable 9.

However, the rate of data transmission via a wireless LAN is significantly lower than the transmission rate via a cable. In particular, if large quantities of data recorded in the second information processing device 12 are to be transferred, transmission time will be prolonged, which is not desirable. This is the reason the first and the second information processing devices 10 and 12 are interconnected by the LAN cable 9 so that the first information processing device 10 will acquire application data from the second information processing device 12 via the LAN cable 9. Compared with the transmission via the wireless LAN, the cable-based transmission appreciably cuts down on the transmission time involved.

The user connects the first information processing device 10 with the second information processing device 12 using the LAN cable 9, and operates the "Next" button on the guidance screen depicted in FIG. 5B. This causes the data item acquiring section 106 to acquire the data items and data sizes recorded in the auxiliary storage device of the second information processing device 12. After the data item acquiring section 106 acquires the data items and data sizes, the screen generating section 100 causes the display device 4 to display a data item selection screen.

FIG. 7A depicts a typical data item selection screen. The screen generating section 100 calculates the total size of each data category and causes the display device 4 to display the data item selection screen that includes the total data sizes associated with the data categories. The screen of this example displays three data categories: "Applications," "Save data," and "Settings." The user may have other categories displayed by operating a scroll bar on the right. With the highlight frame set to "Applications," operating the "Next" button causes the screen generating section 100 to generate a selection screen for selecting the applications to be acquired from the second information processing device 12. The screen generating section 100 causes the display device 4 to display the generated selection screen.

FIG. 7B depicts a typical application selection screen. The user selects the applications to be copied from an application list. At this point, the user may select all applications (i.e., games) recorded in the second information processing device 12. Alternatively, the user may select only the games that the user wants to play from then on. The user selects individual game titles by moving the highlight frame to the desired game titles one by one and by operating the Enter button. The selection receiving section 108 receives the selecting operations performed by the user. After selecting the applications, the user sets the highlight frame in thick lines to the "Next" button and presses the Enter button. This completes the application selecting operation.

FIG. 8A depicts a typical copy sequence designation screen. When the user operates the "Next" button on the selection screen of FIG. 7B, the screen generating section 100 causes the display device 4 to display the copy sequence designation screen for designating the copy sequence. On the sequence designation screen, the user designates the sequence in which to copy the selected multiple applications. In this example, four applications, i.e., game title 1, game title 3, game title 5, and game title 6 are selected to be copied. The user sets an ordinal position of 4 to the game title 1, 2 to the game title 3, 1 to the game title 5, and 3 to the game title 6 to complete the sequence.

In the first information processing device 10, the executing section 112 has the function of allowing one application whose data is fully copied to become executable without waiting for the other application data to be copied. The executing section 112 may further have the function which, when a portion of game software for execution of the game software has been copied, will allow the game to be played without waiting for the entire game software to be copied. If the user has a particular game desired to be played immediately, the user sets "1" to that game as its ordinal position in the copy sequence. In FIG. 8A, the user sets "1" to the game title 5 as its the ordinal position. This allows the user to start playing the game of the game title 5 as soon as a relevant portion of the game software of the game title 5 has been copied.

After designating the copy sequence, the user operates the "Next" button. This causes the selection receiving section 108 to receive the designated sequence. Thereafter, a transfer data verification screen is displayed.

FIG. 8B depicts a typical transfer data verification screen. While the user has selected the desired applications on the selection screen depicted in FIG. 7B, the user can likewise select the save data and the setting data. This verification screen also displays "estimated time for the first game to become playable" and "estimated time for all data to be copied." The "estimated time for the first game to become playable" is the estimated time until the game title 5 being copied to become executable. The screen generating section 100 calculates the estimated times based on the data sizes, and presents the user with the calculated time estimates. This allows the user to know how long it takes to make the copies.

When the user operates the "Next" button on the transfer data verification screen, the operation to select the application data is terminated.

Thereafter, operations are started to change the association information associating the user account with the used device information.

FIG. 9A depicts a typical primary device registration screen. On this registration screen, "the game device to be always used" means the "primary device." Before the first information processing device 10 is connected to the management server 5, the management server 5 has the second information processing device 12 registered therein as the primary device in association with the user account. In the ensuing description, the association information associating the user account with the information identifying the second information processing device 12 will be referred to as the "first association information." Before the first information processing device 10 is connected to the management server 5, the management server 5 has managed the first association information, with the second information processing device 12 also holding the first association information. In this manner, the second information processing device 12 has been bound to the user as the primary device.

As mentioned above, the primary device is granted various privileges. When the old second information processing device 12 is replaced with the new first information processing device 10, it is preferred that the first information processing device 10 be set as the primary device. Thus the screen generating section 100 generates the primary device registration screen and causes the display device 4 to display the generated screen. On the registration screen, the user sets the highlight frame to "Change" and operates the Enter button of the input device 6.

In the foregoing description, it was assumed that there is one user. However, since the first and the second information processing devices 10 and 12 are each shareable by multiple users, there is a possibility that two or more users may have registered the second information processing device 12 as the primary device. It is assumed here that the single user discussed so far is the "user A." When the user A changes the primary device to the first information processing device 10, it is preferred that the other users be prompted to change their primary device to the first information processing device 10 as well.

After the user A has selected "Change" on the registration screen depicted in FIG. 9A, the screen generating section 100 thus causes the display device 4 to display a user selection screen for selecting the other users who have registered the second information processing device 12 as the primary device. Explained below is a case where users B and C have registered the second information processing device 12 as the primary device.

The user selection screen displays the user names of the users B and C. If the user B has signed in to the management server 5, the user A can select the user B by setting the highlight frame to the user name of the user B before operating the Enter button. Meanwhile, if the user C has yet to sign in to the management server 5, the user A can still select the user C by setting the highlight frame to the user name of the user C, operating the Enter button, and inputting the password of the user C. In this manner, the user A can change not only his or her own primary device but also the primary device of the users B and C at the same time. This saves the users B and C the trouble of changing their primary device on their own.

FIG. 9B depicts a typical final confirmation screen. After the user A has performed the operations of the above-described procedure, the screen generating section 100 causes the display device 4 to display the final confirmation screen. When the user A sets the highlight frame to "Yes" on the screen and operates the Enter button of the input device 6, the process of acquiring the application data and updating the association information is started.

<Application Data Acquisition Process>

The first and the second information processing devices 10 and 12 retain each other's internet protocol (IP) address acquired when they are interconnected by the LAN cable 9. The recording processing section 104 transmits a data acquisition request to the second information processing device 12 via the LAN cable 9 on the basis of the information set on the screens of FIGS. 7A, 7B, and 8A. The recording processing section 104 transmits an application data acquisition request to the second information processing device 12 in accordance with the sequence designated on the screen of FIG. 8A. In turn, the second information processing device 12 transmits via the LAN cable 9 the application data designated by the data acquisition request. The recording processing section 104 acquires the application data from the second information processing device 12 and records the acquired application data to the auxiliary storage device 2. The recording processing section 104 may transmit to the second information processing device 12 a data acquisition request for each application. Alternatively, the recording processing section 104 may transmit to the second information processing device 12 a data acquisition request for all data including their sequence. The second information processing device 12 can transmit the application data to the first information processing device 10 in keeping with the designated sequence.

While the application data is being acquired, the screen generating section 100 may cause the display device 4 to display a progress bar showing acquisition status of the application data per application. The screen generating section 100 may display a Start to play button in place of the progress bar for the application that has become executable.

<Association Information Updating Process>

Also, the recording processing section 104 transmits a request to change the primary device associated with the user account of the user A to the management server 5 via the wireless LAN. Upon acquiring the primary device change request, the management server 5 deletes the first association information associating the user account with the second information processing device 12, and transmits to the second information processing device 12 an instruction to delete the first association information as well. In turn, the second information processing device 12 deletes the first association information it has held. In this manner, after acquiring the primary device change request and before updating the association information, the management server 5 deletes the first association information it has managed and causes the second information processing device 12 to delete its first association information.

The management server 5 proceeds to register association information associating the user account of the user A with the first information processing device 10 (the information will be called the "second association information" hereunder). The management server 5 transmits the second association information to the first information processing device 10. The recording processing section 104 records the second association information to the auxiliary storage device 2. This allows the information processing system 1 to bind the first information processing device 10 as the primary device to the user A. Where the users B and C are involved, the first information processing device 10 is also bound to the users B and C as the primary device. After the first information processing device 10 has been connected to the management server 5 via the AP 8, the management server 5 thus replaces the first association information with the second association information. When the first information processing device 10 holds the second association information acquired from the management server 5 via the AP 8, the users can use the first information processing device 10 as the primary device.

According to the information processing system 1, as described above, the user need only operate the newly purchased first information processing device 10 to copy the desired application data to the auxiliary storage device 2 of the first information processing device 10. In so doing, the user can also change the primary device. If there may be require individual operations of the first and the second information processing devices 10 and 12, the connection with the display device 4 would have to be switched between the first and the second information processing devices 10 and 12. With the embodiment, by contrast, there is no need for the switching, which reduces the trouble for the user to perform the operations to acquire the application data.

In the association information updating process, the cable connection is utilized in place of the wireless LAN. This shortens the time for acquiring the application data.

It is to be understood by those skilled in the art that suitable combinations of constituent elements and processes of the embodiment described above as an example may lead to further variations of the present disclosure and that such variations also fall within the scope of the present disclosure.

For example, in the above-described embodiment, the first and the second information processing devices 10 and 12 are interconnected using the LAN cable 9, with the first information processing device 10 acquiring the application data from the second information processing device 12. In a variation, the first and the second information processing devices 10 and 12 may be interconnected using a USB cable, with the first information processing device 10 acquiring the application data from the second information processing device 12.

In the above variation, the second information processing device 12 has a USB host function. In this case, the second information processing device 12 acting as the host writes its application data to the first information processing device 10 acting as storage. The first information processing device 10 thus acquires the application data via the USB cable.

The present disclosure contains subject matter related to that disclosed in Japanese Priority Patent Application JP 2016-109307 filed in the Japan Patent Office on May 31, 2016, the entire content of which is hereby incorporated by reference.

What is claimed is:

1. An information processing device connected to a local wireless local area network constituted by an access point, the information processing device acquiring application data from another information processing device connected to the local wireless local area network, the information processing device comprising:
    a device detecting section configured to detect the another information processing device connected to the local wireless local area network via the access point; and
    a recording processing section configured, after the device detecting section has detected the another information processing device connected to the local wireless local area network, to acquire the application data from the another information processing device via a cable,
    wherein a first end of the cable is directly coupled to a wired communication module of the information processing device, and
    wherein a second end of the cable is directly coupled to a wired communication module of the another information processing device for direct transfer of the application data over the cable.

2. The information processing device according to claim 1, further comprising:
    a screen generating section configured to generate a screen regarding operations to acquire the application data.

3. The information processing device according to claim 2, wherein, after the device detecting section has detected the another information processing device connected to the local wireless local area network, the screen generating section generates a guidance screen on a display of the information processing giving an instruction to a user of the information processing device to operate a power button of the another information processing device to transition the another information processing device to a standby mode to ensure the another information processing device is accessible to the user.

4. The information processing device according to claim 2,
    wherein, after the device detecting section has detected the another information processing device connected to the local wireless local area network, the screen generating section generates a guidance screen on a display of the information processing device giving an instruction to connect the first end of the cable to the wired communication module of the information processing device and the second end of the cable to the wired communication module of the another information processing device using the cable.

5. The information processing device according to claim 2,
    wherein the screen generating section generates a screen for selecting an application to be acquired from the another information processing device.

6. The information processing device according to claim 2, wherein the information processing device is configured to communicate via the access point with a management server managing association information associating a user account with used device information, and after the information processing device is connected to the management server via the access point, the recording processing section acquires from the management server the association information associating the user account with information identifying the information processing device and records the acquired association information.

7. A data acquisition method whereby an information processing device connected to a local wireless local area network constituted by an access point acquires application data from another information processing device connected to the local wireless local area network, the data acquisition method comprising:

after detecting the another information processing device connected to the local wireless local area network via the access point, acquiring the application data from the another information processing device via a cable, wherein a first end of the cable is directly coupled to a wired communication module of the information processing device, and wherein a second end of the cable is directly coupled to a wired communication module of the another information processing device for direct transfer of the application data over the cable.

8. A non-transitory computer readable recording medium having stored thereon a program for computer connected to a local wireless local area network constituted by an access point, the program comprising:

by a device detecting section, detecting an information processing device connected to the local wireless local area network via the access point; and by a recording processing section, after detecting the information processing device connected to the wireless local area network, acquiring application data from the information processing device via a cable, wherein a first end of the cable is directly coupled to a wired communication module of the information processing device, and wherein a second end of the cable is directly coupled to a wired communication module of the another information processing device for direct transfer of the application data over the cable.

9. The information processing device according to claim 4, wherein the another information processing device does not have a display.

* * * * *